Figure 1:
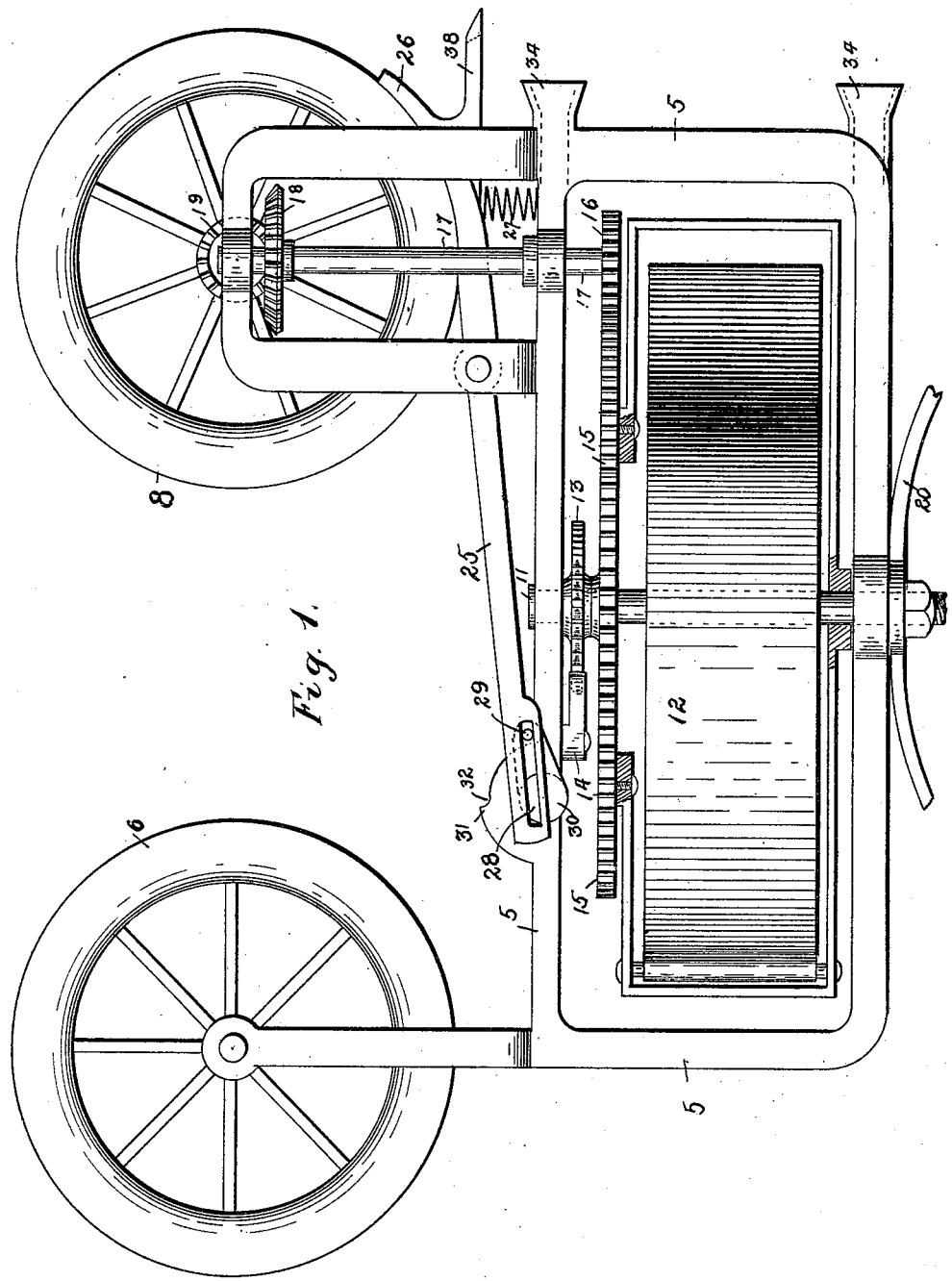

(No Model.)  2 Sheets—Sheet 1.

G. A. MILBRADT.
CASH CARRIER.

No. 449,082.  Patented Mar. 24, 1891.

Witnesses:
S. W. Roberts
a. m. Gaskill

Inventor,
Gustave A. Milbradt
By Paul & Merino Attys.

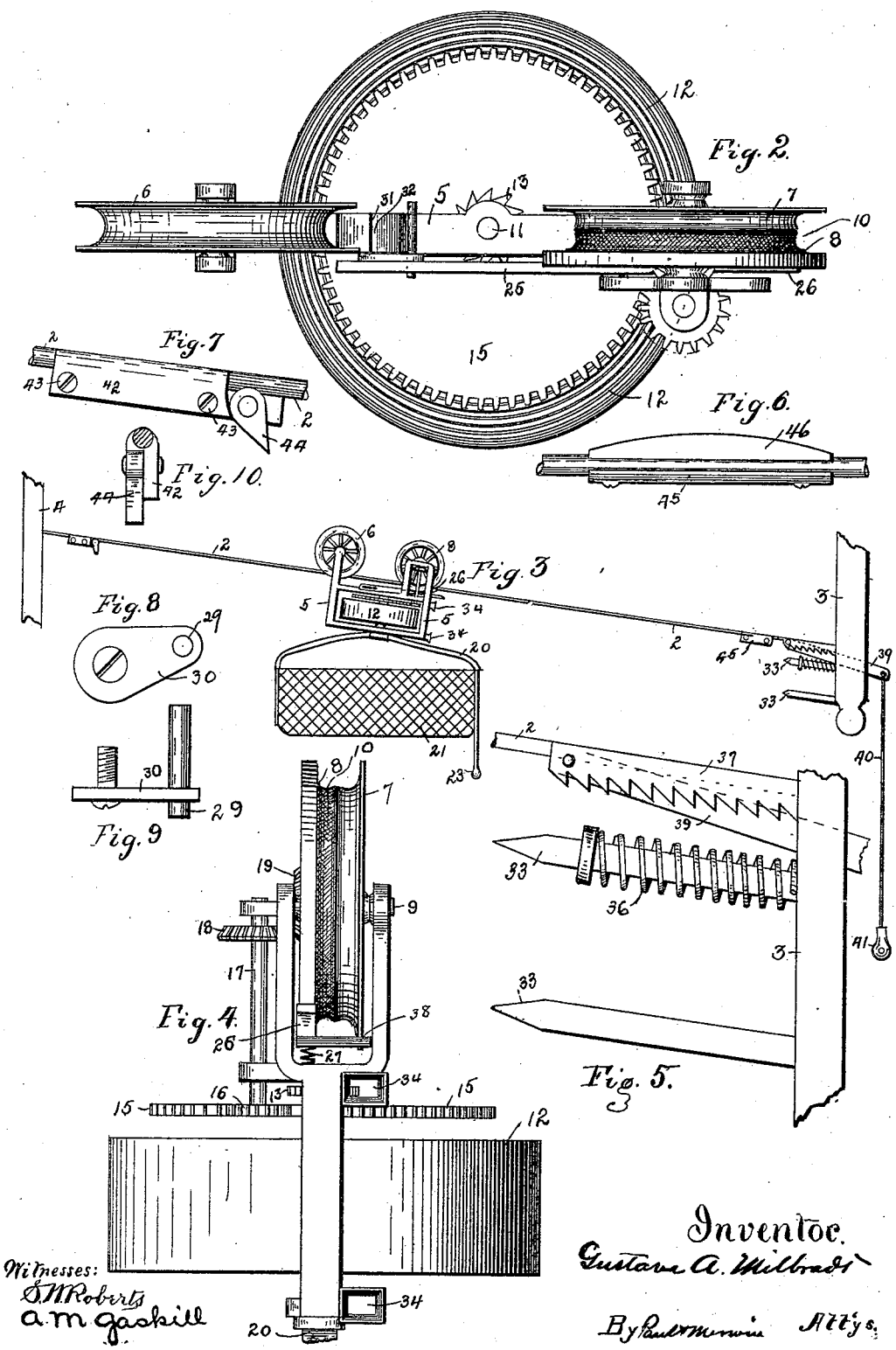

UNITED STATES PATENT OFFICE.

GUSTAVE A. MILBRADT, OF ST. PAUL, MINNESOTA, ASSIGNOR OF ONE-HALF TO CHARLES TREADWELL, OF SAME PLACE.

CASH-CARRIER.

SPECIFICATION forming part of Letters Patent No. 449,082, dated March 24, 1891.

Application filed May 12, 1890. Serial No. 351,570. (No model.)

*To all whom it may concern:*

Be it known that I, GUSTAVE A. MILBRADT, of St. Paul, Ramsey county, Minnesota, have invented certain Improvements in Cash-Carriers, of which the following is a specification.

My invention relates to improvements in devices for the automatic transportation of small articles of merchandise from point to point in stores or other places of business; and it consists, generally, in a suitable frame having supporting-wheels adapted to run upon a wire, one of said wheels being a drive-wheel actuated by spring mechanism and having a brake fitted with automatic locking mechanism, and means for tripping said locking mechanism to release the brake, said carrier-wheels being so arranged that the drive-wheel may be alternately employed with one of the idler-wheels as a support for the carrier, the one carrying it up the wire and the other down. Said frame is also provided with a vertical winding-shaft, upon which the basket is supported in such manner that the turning of the basket serves to wind up the propelling mechanism of the carrier.

My invention further consists in the construction and combination hereinafter described, and particularly pointed out in the claims.

In the accompanying drawings, forming part of this specification, Figure 1 is a side elevation of my improved carrier; Fig. 2, a plan view of the same; Fig. 3, a side elevation of the same with its supporting-wire, showing the attachments at either end of said wire. Fig. 4 is an end elevation of the carrier. Fig. 5 is a detail of the wire attachments at the lower end or station of the same, showing means for automatically securing the carrier at that end of the wire and for releasing the same when desired to propel it toward the other end of the wire. Fig. 6 is a detail of the switch for automatically shifting the position of the carrier on the wire from the loose to the driving wheel. Figs. 7 and 10 are details of the dog at the upper end of the inclined carrier-wire for tripping the brake of the carrier and stopping the same. Figs. 8 and 9 are details of the crank or eccentric for locking the brake off from the carrier drive-wheel, and Fig. 9 is a detail of the mechanism for holding the carrier at the lower end of the wire.

In the drawings, 2 represents the wire which serves as support and track for the carrier to run upon. It is secured at either end to rigid supports or posts 3 and 4 in an inclined position, the lower end being secured to the post 3, and is drawn as rigid as possible by strong tension.

The carrier consists of the frame 5, having the supporting-wheels 6, 7, and 8, from which the frame hangs. These wheels are grooved to run upon the wire 2 and to transport the frame and its attachments and load. The wheels 6 and 7 are loose or idler wheels, while the wheel 8, arranged upon a common shaft 9 and parallel with the wheel 7, is the driving-wheel. The drive-wheel is preferably fitted with a rubber tire 10, so that it may adhere to the wire without slipping. Secured upon a vertical spindle or shaft 11, journaled centrally in the frame 5, is the heavy coil-spring 12, which serves as the main or driving spring of the device.

Secured rigidly upon the spindle 11 is the ratchet 13, engaging which is the spring-controlled pawl 14. Journaled loosely on the spindle 11 is also a gear 15, which meshes with the pinion 16, mounted on the vertical shaft 17, journaled in the frame of the machine, and carrying at its upper end the bevel-gear 18, which in turn meshes with the bevel-pinion 19, rigidly secured to the shaft 9 of the drive-wheel. The mainspring 12, wound about the spindle 11, has its inner end secured to the spindle and its outer end secured to the gear 15. Consequently by winding the spindle or shaft 11, the shaft 17 being held from turning, the spring is coiled closer and closer upon the spindle 11, which is held from turning backward by the ratchet-and-pawl attachments. The spring by its tension tends to turn the gear-wheel 15, and through the described connections also the drive-wheel 8, causing it to travel along the wire. Rigidly secured to the downwardly-projecting end of the spindle 11 is the bail 20, to which is pivotally-supported the basket 21. One side of the bail is continued downward and furnished with a handle 23, by means of which the basket may be rotated and the spindle 11 turned to wind up the mainspring. A suitable box or case 24 may, if desired, be fitted about the main spring to cover the same and give the carrier an ornamental appearance.

Pivotally secured to the frame of the carrier is the brake-lever 25, one end of which is formed into the brake-shoe 26, which is adapted to bear upon the periphery of the drive-wheel, a spiral spring 27 tending to hold it in contact therewith. The opposite end of the lever is provided with a longitudinal slot 28, in which lies the pin 29 of the eccentric or crank 30, which is pivoted to the frame 5. When the brake is in contact with the wheel, the pin 29 lies near the inner end of the slot; but when the brake-shoe is thrown away from the wheel the pin moves along the slot and turns the eccentric or crank until the pin stands nearly vertically above the pivot of the crank, thus locking the arm in that position. If preferred, a shoulder 31, with a slight depression 32 in the top thereof, may be arranged upon the frame in such position that when the pin 29 is turned above it, it will slip over and rest in the depression, so as to positively lock the brake out of engagement with the wheel. It will thus be seen that when the carrier is placed upon the wire with the loose wheel 6 and drive-wheel 8 standing upon the wire, if the brake is in contact with the drive-wheel, as shown in the full lines of Fig. 1, the wheel is held from turning and the carrier thus stands upon the wire without moving in either direction; but if the brake is thrown off from the wheel the tension of the mainspring, acting through its connecting-train of gears, causes the drive-wheel to rotate and propel the carrier along the wire, the carrier being so placed upon the wire that its forward movement will be up the incline.

In order to hold the carrier at the lower end of the wire in a firm position, so that the spring may be wound up to store power to propel it to the upper station, I prefer to arrange one or more prongs or projections 33 upon the standard or post 3, which will enter sockets or eyes 34, having funnel-shaped openings or mouths 35, to guide the prongs on entering. If desired, a spring 36 may be arranged upon one of these prongs to serve as a cushion to receive any shock or blow from the carrier when descending toward the post 3. To hold the carrier upon these prongs and prevent its starting forward until the mainspring is wound up, and it is desired to start the carrier, I prefer to arrange the rack-bar 37, rigidly secured to the standard 3 in such position as to be engaged by the catch 38 extending laterally from the brake end of the arm or lever 25, so that when the carrier is moved down upon the prongs 33 the catch 38 engages the rack-bar, thus holding the carrier in place from forward movement. Pivoted upon the rack-bar at or near its forward end and parallel therewith is the straight arm or lever 39 in such position as to be lifted slightly above the notches by the catch 38, when engaging the rack-bar. Depending from the free end of the arm 39 is a suitable cord 40, provided with a handle 41, in a convenient position to be grasped by the hand in operating the device. Upon pulling down on the cord the arm 39 is depressed, throwing the catch 38 out of the notch of the rack-bar with which it is engaged, and depressing the brake-lever, so that it is locked out of engagement with the drive-wheel, in the manner above described. The carrier is then free to move forward and upward on the inclined wire under the impulse of its spring, which has been wound while the carrier was locked to the standard 3.

In order to stop the carrier when it shall have arrived at its upper station and to retain the unexpended power stored in the spring, I prefer to arranged upon the wire a device to automatically trip the brake arm or lever, which will thus be thrown by its spring into engagement with the drive-wheel, stopping its rotation and holding the carrier upon the wire from movement in either direction, and also holding the mainspring from being unwound further. Any suitable device desired may be used for this purpose; but I prefer to use that shown in the drawings in which the straps 42 are clamped upon the wire 2, with their upper edges in line with the top of the wire, the inner meeting faces of the straps being grooved out to receive the wire, screws 43, or some equivalent device being used to firmly secure the straps together in engagement with the wire. Pivotally connected to the projecting ends of one of these straps is the cam 44, bearing against the square end of the other strap 42, as a shoulder. The cam thus in its normal position hangs of its own weight, as shown in Fig. 7, being held by contact with the end of the strap 42 from movement in that direction, but free to turn on its pivot in the opposite direction. This cam is so arranged that as the carrier reaches this point the pin 29 will be brought in contact with the cam and pushed backward off the shoulder 31, when the spring 27 will force the brake-lever into engagement with the drive-wheel, the pin 29 dropping low enough to pass under the cam as carried forward by the momentum of the carrier.

When it is desired to return the carrier down the wire to its first-described position, all that it is necessary to do is to lift the rear end of the carrier slightly and move it one side, carrying the drive-wheel off the wire and the adjacent loose wheel 7 onto the wire. On releasing the carrier it will thereupon descend the wire of its own gravity. In order to check the momentum of the carrier just before it reaches the lower end of the wire, and to replace the drive-wheel on the wire in position for the return movement of the carrier, I prefer to arrange on the wire near the rack-bar 37, or at any suitable distance therefrom, a clamp 45, formed similarly to the one above described, having one of the straps 46 forming the clamp on the side adjacent to the loose wheel 7 thicker than the other and with rounded surface, against which the outer flange of the loose wheel 7 will strike and be carried one side sufficiently to switch the carrier from the loose wheel to the drive-wheel, the drive-wheel thus standing on the wire, and by sliding along the same checking the momentum of the carrier, so as not to strike against the standard or its attachments with injurious force, the switch, however, being arranged in such a position with reference to the length and incline of the wire that the momentum of the carrier will be sufficient to move it onto the prongs and into engagement with the rack-bar. It is evident that, if desired, a switch and locking mechanism may be arranged at the upper end of the wire to similarly serve to throw the carrier from the drive-wheel onto the loose wheel and to lock it until released for its downward trip.

The wire for supporting and serving as a track for the carrier is secured in a stationary position with such incline as may be desired or may be necessary to convey the carrier from the proper or convenient height at the lower end or salesman's station to a convenient height for the cashier of bundle-wrapper at the other end, and the carrier itself may be constructed to adapt it for the transporting of articles or parcels of any size or as a cash-carrier only. It is also obvious that the carrier may be arranged to be carried in either direction by means of its spring either upon the same or a return-wire or upon a level as well as an inclined wire.

Mode of operation: The carrier being at its lower position and locked to the standard, the article to be transported by it is placed in the basket. The basket is rotated a few turns by means of its handle to give the spring the required tension for the distance to be traveled or to wind up the spring. The lever 39 is tripped by means of its cord releasing the carrier from the locking mechanism, when it immediately runs along the wire at a high speed as impelled by the spring. On reaching the upper station the brake-lock is tripped and the drive-wheel stopped, as described. The load having been placed in the basket, the carrier is returned from the upper to the lower station by lifting the drive-wheel of the carrier off the wire and placing the loose wheel on the wire, when the carrier will descend of its own gravity to the other end of the wire. As the outer flange of the loose wheel strikes the strap 46 it will be carried off the wire and the drive-wheel shifted onto the wire, and as the drive-wheel is held by its brake it will slide upon the wire, and thus check the movement of the carrier.

The attachments are so placed in connection with the wire that the carrier will have sufficient momentum to move into engagement with the rack-bar and prongs, and thus be held from lateral and forward movement until released, as above described.

I claim—

1. In a cash-carrier adapted to run upon an inclined wire, the combination of a drive-wheel, automatic mechanism for actuating the same, an idler carrying-wheel, and mechanism for automatically throwing the idler-wheel off and the drive-wheel onto the wire, substantially as and for the purposes set forth.

2. In a cash-carrier adapted to run upon a fixed inclined wire, the combination of a drive-wheel having a rubber tire thereon for propelling the carrier up the incline, an idler-wheel adapted to transport it by force of gravity down the wire, automatic driving mechanism actuating the drive-wheel, and mechanism for automatically throwing the idler-wheel off and the drive-wheel onto the wire as the carrier descends, substantially as and for the purposes set forth.

3. In a cash-carrier apparatus, the combination, with its driving-wheel, of means for automatically actuating said drive-wheel to propel the carrier in one direction, a loose wheel adapted to support and transport said carrier in the opposite direction by force of gravity, and means for automatically shifting the loose wheel off and the drive-wheel onto the wire, as and for the purposes set forth.

4. In a cash-carrier, the combination, with its drive-wheel adapted to transport the carrier along the track or wire, of a mainspring, a train of gears connecting said spring with said drive-wheel, a vertical winding-shaft for said spring, and a receptacle or basket connected to and supported by said shaft in such manner that by the rotating of the basket the shaft is turned to wind the spring, substantially as described.

5. In an apparatus of the class described, the combination of a fixed inclined track-wire, a drive-wheel to run upon the same and transport the carrier upon the incline, spring-actuated mechanism for turning the drive-wheel, a brake for said drive-wheel, a spring normally holding said brake upon said wheel, locking mechanism for holding the brake off the wheel, and means for automatically tripping said locking mechanism to apply the brake when the carrier has reached its destination, substantially as described.

6. In an apparatus of the class described, the combination of a drive-wheel for carrying it up an inclined track and a loose wheel for carrying it down the track, spring-actuated mechanism for turning said drive-wheel, a spring-controlled brake normally bearing upon the drive-wheel, locking mechanism to hold the brake off the wheel, means for automatically tripping said locking mechanism when the carrier has reached its destination, so as to stop the same and to conserve the energy of the driving-spring, and means for automatically throwing the wheel off and the drive-wheel onto the track when the carrier has nearly reached its other destination, so that the momentum of the carrier is gradually checked by the sliding of the drive-wheel along the wire as held by its brake, substantially as and for the purposes set forth.

7. In a carrier of the class described, the combination, with its frame, of the shaft 9, journaled therein, the drive-wheel 8, rigidly secured to said shaft, and the wheel 7, journaled on said shaft, an automatic brake attachment to said drive-wheel, the mainspring 12, geared to said drive-wheel, a winding-shaft 11, connected to said spring, and the basket-supporting bail 20, rigidly secured to said shaft 11 and adapted to be rotated to wind said shaft, substantially as and for the purposes set forth.

8. In a carrier of the class described, having a drive-wheel and means for automatically actuating the same, the combination therewith of a brake adapted to bear upon said drive-wheel, a spring acting upon said brake to press it against the drive-wheel, and means for automatically locking said brake when thrown off from said wheel, substantially as described.

9. In an apparatus of the class described, the combination of a drive-wheel running upon the supporting-track, a mainspring and connecting train of gears for actuating said drive-wheel, a vertical winding-shaft for said spring serving also as a support for the carrier-receptacle, so that by the rotating of the receptacle the spring is wound, a brake for said drive-wheel, and an automatic means for applying the same to stop the movement of the carrier and conserve the energy of the mainspring, substantially as described.

10. In a carrier of the class described, adapted to be propelled by means of a driving-wheel bearing upon the wire and actuated by automatic mechanism, the combination, with said drive-wheel, of a spring-controlled brake, self-locking mechanism engaging said brake when thrown off, means for automatically tripping said locking mechanism to apply said brake and stop the driving mechanism, and means for throwing off said brake and releasing said driving mechanism, substantially as described.

11. In apparatus of the class described, the combination, with a stationary inclined track-wire and its carrier, of the carrier drive-wheel supported on said wire, a similar loose wheel also adapted to support the carrier upon the wire, automatic actuating mechanism for the drive-wheel, a brake, a spring normally holding said brake in engagement with said drive-wheel, automatic locking mechanism for holding said brake out of engagement with said wheel, means for automatically tripping said locking mechanism at the carrier's destination at the upper end of said wire, means for automatically shifting the loose carrier-wheel from the wire and the drive-wheel onto the wire at the lower carrier-station, and means for throwing off the brake, substantially as and for the purposes set forth.

12. The combination of the inclined wire 2, the carrier drive-wheel 8, adapted to run upon said wire, the spring 12 and its connecting train of gear for actuating said drive-wheel, the ratchet-controlled shaft 11 for winding said spring, the bail 20 for supporting the carrier-basket and turning the shaft 11, the brake-lever 25, having the spring 27 and automatic locking mechanism, the loose wheel 7, adapted to run upon said wire and support the carrier thereon, the brake-releasing mechanism secured to the upper end of said wire, the clamp 45 at the lower end of said wire, the rack-bar 37, adapted to engage and lock said brake-lever, the prongs 33, adapted to engage the frame of the carrier, and the pivoted lever 39, adapted to throw said brake-lever out of engagement with said rack-bar, substantially as and for the purposes set forth.

In testimony whereof I have hereunto set my hand this 30th day of April 1890.

GUSTAVE A. MILBRADT.

Witnesses:
T. D. MERWIN,
A. MACWELCH.